United States Patent [19]
Glorioso

[11] 3,983,317
[45] Sept. 28, 1976

[54] ASTIGMATIZER FOR LASER RECORDING AND REPRODUCING SYSTEM

[75] Inventor: Charles A. Glorioso, San Francisco, Calif.

[73] Assignee: Teletype Corporation, Skokie, Ill.

[22] Filed: Dec. 9, 1974

[21] Appl. No.: 530,887

[52] U.S. Cl. .......................... 178/6.6 R; 178/6.7 A; 179/100.3 V; 179/100.3 G; 350/190; 350/271; 340/173 LM; 178/6.6 DD
[51] Int. Cl.$^2$ ...................... G11B 7/18; H04N 5/76
[58] Field of Search ........ 178/6.7 A, 6.6 R, 6.6 DD; 179/100.3 V, 100.3 G, 100.41 L; 350/190, 271, 162 SF; 340/173 LM; 346/76 L, 108

[56] References Cited
UNITED STATES PATENTS

| | | | |
|---|---|---|---|
| 3,314,075 | 4/1967 | Becker | 178/6.7 R |
| 3,567,855 | 3/1971 | Hamisch | 179/100.32 |
| 3,623,024 | 11/1971 | Hamilton | 179/100.3 G |
| 3,825,323 | 7/1974 | Landwer | 179/100.3 V |
| 3,829,622 | 8/1974 | Elliot | 179/100.3 V |
| 3,913,076 | 10/1975 | Lehureau | 179/100.3 V |

OTHER PUBLICATIONS
"The Optical Scanning System of the Philips 'VLP' Record Player", Philips Tech. Rev. 33, pp. 186–189, 1973, No. 7, by G. Bouwhuis et al.

Primary Examiner—Vincent P. Canney
Assistant Examiner—Alan Faber
Attorney, Agent, or Firm—D. L. Hurewitz; J. L. Landis

[57] ABSTRACT

In a laser recording system, a high energy intensity laser beam is focused to form a circular write-spot on a rotating thermoplastic disc. This spot creates tracks of grooves and flat areas or lands in accordance with input data. To read the data from the disc a reduced energy beam is focused on the previously recorded track, and the pattern of grooves and lands is determined from the reflected energy. The optics associated with the reading process include an astigmatizer which elongates the read-spot in a direction transverse to the track. This reduces mechanical tolerances required to insure that the read-spot will impinge upon the desired track. The astigmatizer may also serve to reduce the beam spot energy intensity so that the same laser, without the astigmatizer, can be used for the recording process.

In one embodiment, the astigmatizer is a movable plate having a single slit. For reading, the astigmatizer is positioned in the beam path and the slit creates an orthogonal diffraction pattern which provides the elongated read-spot of reduced energy intensity.

13 Claims, 11 Drawing Figures

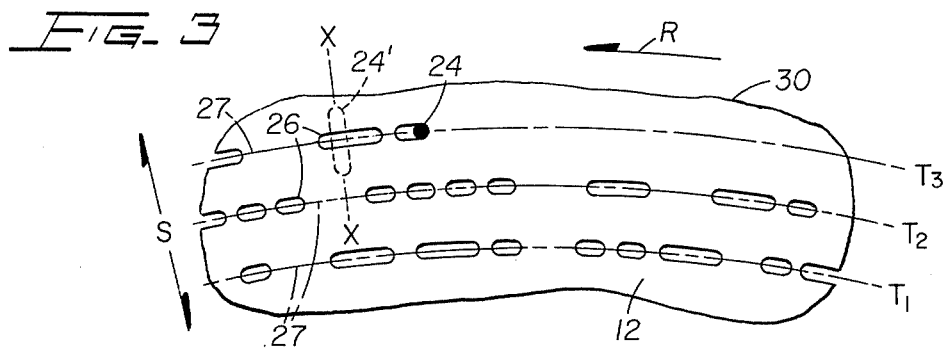
FIG. 3
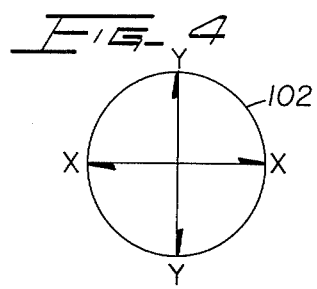
FIG. 4
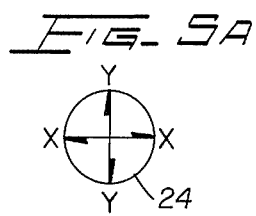
FIG. 5A
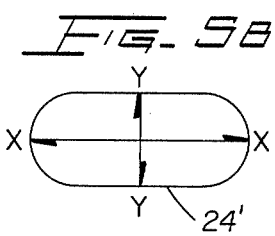
FIG. 5B
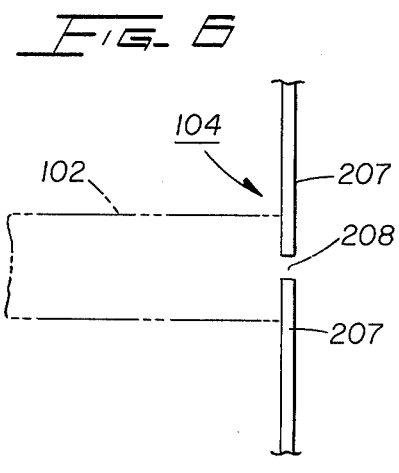
FIG. 6
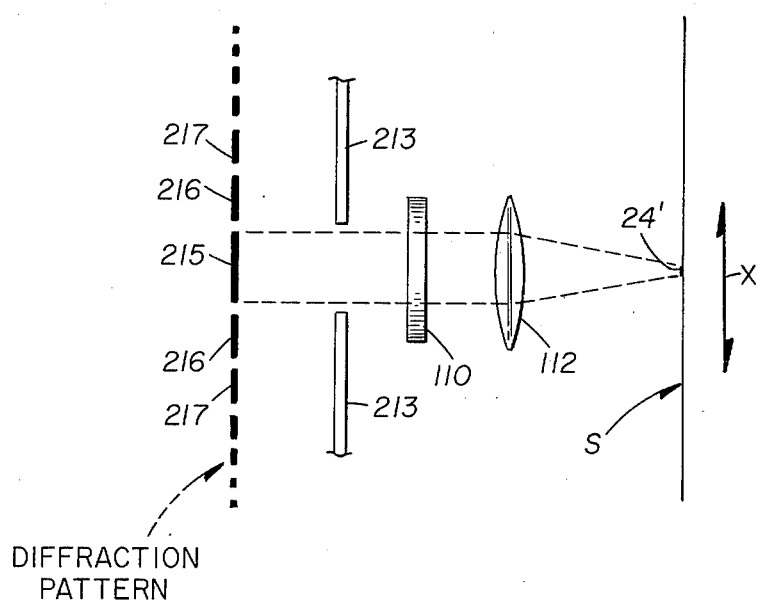
DIFFRACTION PATTERN

ASTIGMATIZER FOR LASER RECORDING AND REPRODUCING SYSTEM

INTRODUCTION AND BACKGROUND OF THE INVENTION

This invention relates generally to a memory system for recording and reproducing digital information using a high intensity energy source, such as a laser, to focus energy on a thermoplastic surface, and, in particular, an apparatus and a method for reproducing the data by using a lower intensity laser beam to sense the topography of the surface.

Laser apparatus for both reading and writing data on a moving surface is generally known, and various features of such systems are disclosed, in particular, in U.S. Pat. Nos. 3,262,122 to H. Fleischer et al., 3,475,760 to C. O. Carlson, 3,815,146 to L. A. Nash and 3,825,323 to D. C. Landwer. Collectively these patents describe the operation of a laser read/write arrangement and all are incorporated by reference herein.

In the laser writing process the laser beam is focused on the surface of a moving film and turned on and off to "write" by forming a series of minute melted depressions in the surface. A single depression corresponds to a digital bit which can be read out in various ways, such as by measuring the reflectivity the surface provides when illuminated by a low power beam. This process is capable of recording vast amounts of information per unit area of the film, because of the small size of the focused beam which can be used; for example, in one recent application of the process, over 10,000,000 individual bits of binary data have been recorded per square inch of recording surface. In these laser recording processes, the laser beam is moved relative to the surface in a regular pattern of one type or another to form a track, and the laser is effectively turned "on" or "off" according to the binary data to record 1's and 0's along the track by melting or not melting in accordance with the data.

In these systems it is advantageous to use a rotating disc or record as the recording member, with a movable recording arm positioning the laser beam such that the recording process generates a spiral track or a set of concentric circular tracks in the record surface, generally analagous to the process used in making phonograph records. The rotating disc approach is very attractive in that the recording process is simple, large amounts of information can be recorded in a relatively small area, and playback or read-out is relatively simple.

While the extremely high density of information melted into the film is desirable, this high density creates problems in reproduction of the data. The focused spot of the laser beam used for reading must be precisely positioned so that it is superimposed upon the desired data grooves of one selected circular track (or portion of the spiral track). These tracks are very narrow and are closely spaced to one another; hence, the drive mechanism which positions the read spot must be held to very high tolerances to insure the repeated and accurate location of the read spot.

It is an object of the present invention to improve the reading technique and to reduce, if not eliminate, the need for these extremely high mechanical tolerances while still insuring that the read spot will impinge only upon the desired track without being erroneously positioned on the space between tracks or on an adjacent track.

SUMMARY OF THE INVENTION

In accordance with the present invention, the laser beam is optically processed to form a focused read spot which is elongated, transverse to the track. The resultant elliptically shaped spot is much less sensitive to positioning than is the round spot used for writing.

The elongated spot is produced by inserting in the laser beam path an astigmatizer which draws the spot out. One such astigmatizer utilizes the principles of diffraction. The laser beam in a read mode is passed through a narrow slit. The slit causes a diffraction pattern transverse to its own orientation so that for elongation in one direction, the slit is positioned in the orthogonal direction.

Alternative optical arrangements can, of course, be used to produce a diffraction pattern to create the desired elongation of the read spot. In addition, the astigmatizer may be a unidirectional lens system or a prism arrangement which will alter the beam in one selected dimension, causing it to elongate in that direction.

In accordance with the preferred embodiment of the invention, the astigmatizer used to elongate the beam is removably positionable in the path of the laser beam so that it may be inserted in the read mode and may be removed in the write mode, thereby allowing a single laser to be used for both recording and reading. However, for reading, the laser beam intensity must be reduced or the beam will write on the surface and the astigmatizer may also serve to attenuate the beam intensity to provide an appropriate level for reading.

Other objects, advantages, and features of the invention will appear from the following detailed description of a specific embodiment thereof when taken in conjunction with the attached drawings.

BRIEF DESCRIPTION OF THE DRAWING

In the drawing.

FIG. 3 is a greatly exaggerated, fragmentary view of a portion of the recording surface shown generally within region 30 in FIG. 1;

FIG. 4 illustrates the cross-section of the laser beam at line 4—4 in FIG. 2;

FIGS. 5A and 5B illustrate cross-sections of the focused laser beam used in the recording and reading processes respectively, taken at line 5—5 in FIG. 2;

FIG. 6 is a diagrammatic representation of the optical principles associated with the astigmatizer embodied in FIGS. 1 and 2;

DETAILED DESCRIPTION

Background - General Recording and Reproducing Process

Figure 1:
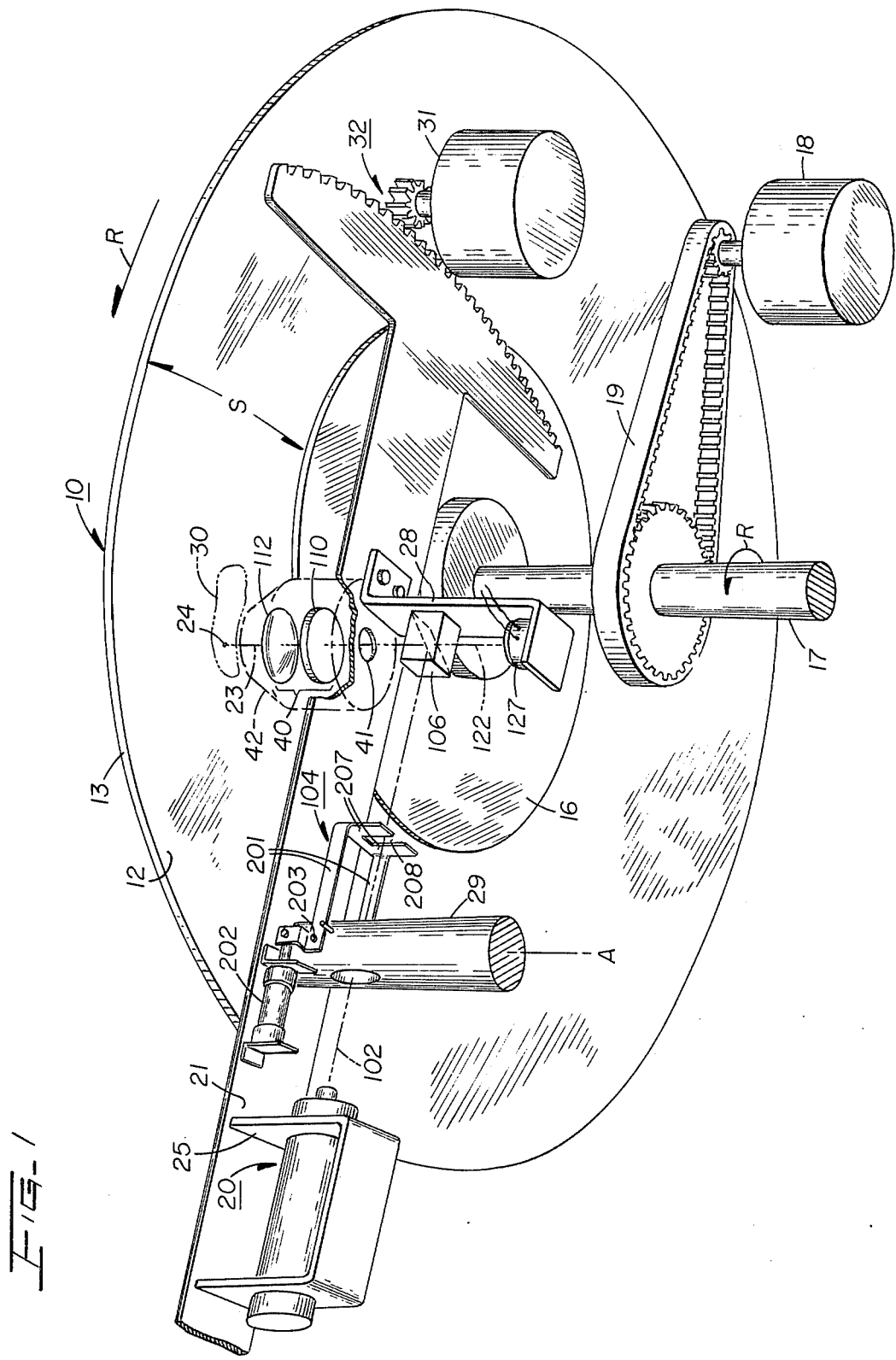
FIG. 1 is a partially schematic perspective view of a laser recording and reproducing system, using an optical system according to the invention.

FIG. 1 illustrates the laser memory apparatus for recording and reproducing. The basic arrangement and operation of the apparatus is disclosed in the patents to Fleischer et al., Carlson, Nash, and Landwer identified hereinbefore. In summary, both the recording (writing) and reproducing (reading) processes preferably utilize a record or disc 10 detachably mounted on a turntable 16. The record 10 includes a thin, thermoplastic film 12 applied to the under surface of a very flat-surfaced backing disc or substrate 13 of a high melting point material, such as glass or aluminum. The film 12, which constitutes the recording surface, may be an acrylic resin, or various other thermoplastic material such as are mentioned in the Fleischer et al. or Carlson patents and preferably is dyed with a complementary material to increase its absorption of the laser energy to be applied.

The turntable 16 includes a flat disc or platform above which the record 10 is received in a precise horizontal plane, and a shaft 17 for rotating the turntable 16 and associated record 10 (arrows R) by a constant speed drive motor 18 through any conventional drive mechanism, such as sprocket and belt transmission 19.

A recording arm 21 is positioned below turntable 16 and parallel to record 10, somewhat similar in arrangement to a standard phonograph recording arm. The arm 21 carries an optical system to be described in detail hereinafter for projecting a focused laser beam 23 on a small spot 24 on the recording surface S of the thermoplastic film 12. As will be explained in more detail hereinafter, when recording (or writing), the laser beam is focused on the film 12, and the beam is turned "on" and "off" in accordance with the data. The focused spot 24 of beam 23 when "on" causes a localized melting of the surface of the film 12 to form a depression or pit in a stationary surface S. However, due to the rotational movement of record 10, during the writing process, the essentially round circular spot 24 actually causes elongated grooves such as 26 (in FIG. 3) in the film 12. When the beam is "off" untouched, flat areas or lands 27 (in FIG. 3) are left between the grooves 26.

The recording arm 21 is mounted on a shaft 29 parallel to the turntable shaft 17. In the example illustrated, the shaft 29 is affixed to arm 21 and is rotatable in a bushing, not shown. Thus, the arm 21 may be pivoted when desired by a conventional, reversible drive motor 31 through an appropriate mechanism such as the gear drive system 32. With this arrangement, the focused spot 24 can be made to traverse the recording surface S of the record 10 in a generally conventional fashion so as to form a spiral recording track around the record 10. Alternately, the arm 21 can be stepped along the surface of the record 10 to preselected positions so as to form a plurality of concentric recording tracks upon which the focused spot 24 falls. Portions of three such adjacent tracks assumed to be within region 30 in FIG. 1 are designated $T_1$, $T_2$, and $T_3$, and are shown in greater detail in FIG. 3. When recording in concentric circular tracks the motor 31 is a stepping motor and can be energized to align the optical system associated with arm 21 with any selected one of several thousand recording tracks which can be formed along the recording surface in the thermoplastic film 12.

To reproduce or read previously recorded information, the record 10 is preferably mounted on the same rotating turntable 16. A desired track T is selected by activating the stepping motor 31. A special "reading" or nondestructive laser beam, similar in position to the beam 23, is applied to the record by an optical system, and the amount of light energy of the reading beam reflected back by a groove 26 on surface S differs significantly from the energy reflected by land 27. This difference can be sensed by a photocell 127 fixedly mounted to arm 21 by bracket 28. The output of photocell 127 is sensed by conventional circuitry which produces a binary data signal corresponding to the data recorded on record 10.

Optical System - Write Mode

Figure 2:
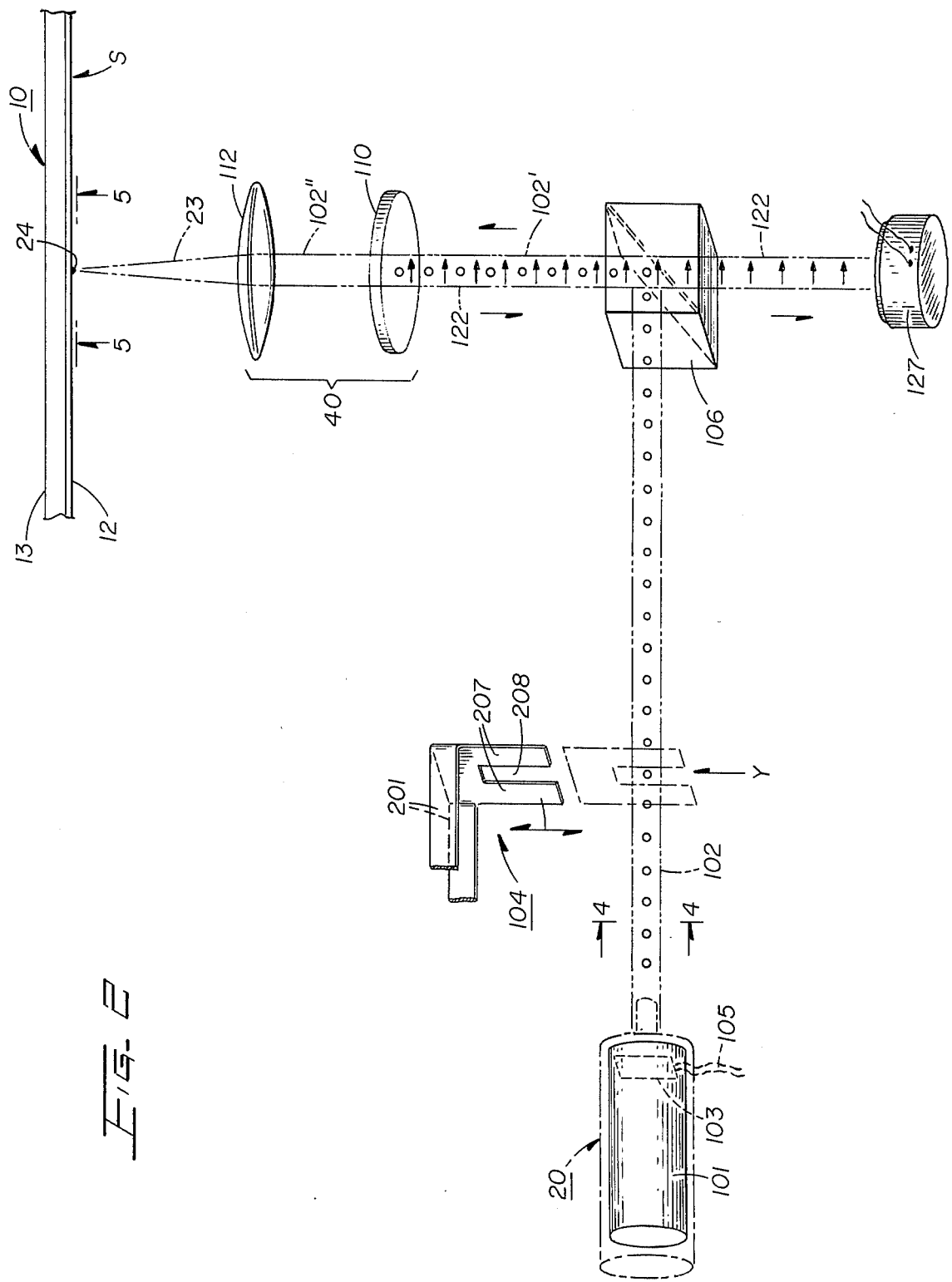
FIG. 2 is a diagrammatic representation of the optical system in accordance with the invention, with most of the mechanical elements of FIG. 1 removed for clarity.

The optical system shown as part of the apparatus in FIG. 1 is reproduced in FIG. 2 in simplified form with many of the mechanical elements of FIG. 1 removed. In accordance with the invention, the laser assembly 20 may house any of various commercially available lasers 101 of appropriate output power, preferably one that is lightweight and compact, since it is preferred to mount the laser assembly to the under surface of the recording arm 21 such as by bracket 25.

The laser 101 is preferably a continuous wave laser including an internal modulator 103 for effectively switching the laser output beam 102 "on" and "off" in response to input data signals applied via data leads 105, in a manner well known in the art. One example of a suitable laser is the Model SE 6040-1.5 TC with internal modulator manufactured by the Jodon Company of Ann Arbor, michigan.

As an alternative to the internally modulated laser, a nonmodulated laser can be used with an external modulator as is well known. A combination of any of a variety of commercially available lasers of the required output power such as Model LSR-4 manufactured by CW Radiation of Mountain View, California, combined with an external modulator such as acousto-optic modulator, Model DLM-1 manufactured by Datalight, Inc., of Bloomfield, Connecticut is straightforward.

The laser is assumed, for discussion, to produce a collimated beam 102, and the output beam 102 is preferably linearly polarized. The laser assembly may, however, be equipped with a diverging lens which would cause a diverging beam 102. While this divergence would require modification of some elements in the optical system, such modifications are straightforward and since they do not affect the present invention, they will not be discussed further. A linear polarization, which is referred to herein as horizontal polarization since the beam's transverse waves are horizontal or parallel to the flat surface of arm 21, is represented in FIG. 2 by dots along the beam 102.

In the record or write mode, the horizontally polarized laser beam 102 follows a beam path from laser assembly 20 through shaft 29 (in FIG. 1) and is intercepted by polarization beam splitter 106, an astigmatizer unit 104 being held out of the beam path by solenoid 202, which when activated rotates an arm 201 about a pivot rod 203, or other appropriate mechanical device. Unit 104 is placed in the beam path only in the read mode as will be described hereinafter. In view of the requirement that the beam 102 passes through the axis A of shaft 29 rotation, (the axis of arm 21), the portion of the shaft 29 traversed by the beam 102 must be optically transparent to the beam and is shown in FIG. 1 as an aperture in shaft 29.

The beam splitter 106 which may be, for instance, Model 502-515 manufactured by the Spectra-Physics Company of Mountain View, California, is a solid structure affixed to arm 21 by bracket 28. It has the characteristic of reflecting light linearly polarized in one polarization by 90° and passing light linearly polarized in the orthogonal direction straight through. The splitter 106 is positioned on arm 21 so that the horizontally polarized light from laser 101 in beam 102 (indicated by dots) is reflected 90° upward through aperture 41 and arm 21 to the objective lens system 40. It is noted that, if present, vertically polarized light will pass straight through splitter 106 but since the output of laser 101 is assumed to be horizontally linearly polarized, essentially all of the output light in beam 102 will be reflected upward as beam 102' as shown in FIG. 2.

The objective lens system 40 located within housing 42 includes a one-quarter wave plate 110 disposed in the optical path from beam splitter 106 to the objective lens 112. this wave plate converts the linearly polarized beam 102' reflected from the splitter 106 into a circularly polarized beam 102'' which is converted to beam 23 when focused by objective lens 112. An appropriate quarter wave plate may be KLC No. WPM4-12.7-BB6328 manufactured by Karl Lambrecht Corp. of Chicago, Illinois.

The objective lens 112 focuses beam 102'' into a spot 24 of appropriate energy density to write on the surface S of disc 10 as was described hereinbefore. In one embodiment, a 3.5 mW laser 101 produces approximately 3mW at the spot 24 due to typical optical losses. With a 3mW circular spot of 0.0001 inch (approximately 0.0025mm) diameter, the maximum depth of focus is about 0.0006 inch (approximately 0.015 mm). For example, a diverging beam produced by a 3.5mW laser assembly and an objective lens of 10mm focal length have been found to produce the appropriate penetration spot size.

The operation of an optical system in the write mode may be seen by reference to greatly enlarged FIGS. 4 and 5A. As is shown in FIG. 4, the cross-section of the beam emanating from laser 101 (at line 4—4) is circular. Horizontal and vertical diameters illustrated as X and Y, respectively, are inserted for reference. FIG. 5A illustrates the cross-section of the beam 23 at line 5—5 which is at or near the focused write-spot 24. While the quarter wave plate 110 converts the polarization from linear to circular, it has no effect upon the spatial orientation of the beam. Thus, the cross-section of beam 23, shown in FIG. 5A, is essentially the same in shape and orientation as is the cross-section of beam 102 in FIG. 4 except, of course, that the former is substantially smaller in size due to the focusing of lens 112.

The optics of the write mode may be summarized as follows: From the output of laser 101 to the beam splitter 106, the beam 102 travels parallel to the recording arm 21. This includes passage through the shaft 29. The beam is reflected 90° upwards and passes through a quarter wave plate 110. Then objective lens 112 forms focused beam 23 which becomes spot 24 on the surface S. With the aligned longitudinal mountings of the laser assembly 20 and beam splitter 106, the focused beam 23 can be directed to any desired track T on the moving record 10 despite movement or stepping of the arm 21 as previously described. This arrangement with the laser assembly 20 and all of the associated optical elements mounted on the arm 21 is very convenient and economical as it does away with separate units which would otherwise be required as well as greatly simplifying the optical system itself.

Alternatively, if the laser cannot be conveniently mounted on arm 21 or if this is not desired for some reason, a fixed external optical system might be provided corresponding approximately to that described in FIG. 2 with a system of mirrors for directing the output of the beam splitter vertically up to the arm 21 precisely along the axis of rotation A, and thence to the objective lens system 40 mounted on the arm 21.

Optical System-Read Mode

Whereas in the recording or write mode, the high intensity beam of circular cross-section is focused on record 10, in the read mode a low intensity beam must be used to avoid writing over the previously made groove in the record surface. in addition, since the tracks T are so close together, on the order of 0.0005 inch (approximately 0.0125mm) between centers, and the tracks themselves are so narrow, on the order of 0.0001 inch (approximately 0.0025mm) wide, the mechanical tolerances are quite severe if it is to be assured that the focused read-spot impinges upon the proper track. Accordingly, it is desirable to produce a reduced intensity read spot which is not circular, but is elongated in the direction essentially transverse to the track, such as beam spot 24' shown dotted in FIG. 3.

In accordance with the present invention, the laser beam emanating from laser assembly 20 in the read mode is optically processed to produce an elongated spot such as 24'. The intensity of the spot must also be reduced and any of many known means such as an attenuating filter can be used. But a single astigmatizer unit may be employed to both elongate the spot and reduce the spot intensity.

One preferred embodiment of an astigmatizer for generating the elongated astigmatized read spot 24' is illustrated in FIGS. 1 and 2. The astigmatizer unit 104 is positioned in the path of beam 102 by deactivation of solenoid 202 or other appropriate mechanical means.

In the read mode the astigmatizer is positioned somewhere in the beam path from the laser 101 to the objective lens 112, and it is shown in its preferred location in the horizontal path of beam 102. The astigmatizer 104 is essentially a plate 207 having a single slit 208 through which the beam 102 passes. The slit, which is narrow relative to the beam diameter, is oriented vertically as shown by the Y axis in FIG. 2. It therefore causes a diffraction pattern of the collimated light in the transverse or horizontal direction. In accordance with fundamental optical principles, the diffraction pattern consists of a central dominant order portion and higher order pair of progressively lower power portions displaced on either side of the central portion in the horizontal direction. The slit has no effect on the vertical dimension of the beam, and therefore the size of each portion of the diffraction pattern in the vertical or Y direction is the same as the diameter of the beam 102. The beam 102, consisting of a diffraction pattern, is reflected upward by beam splitter 106 when it is designated 102'. Beam 102' is passed by the quarter wave plate 110 which converts the horizontal linear polarization to circular polarization but of course leaves the spatial orientation of the beam unchanged.

Accordingly, what is seen at the focal plane of lens 112 is an elongated read-spot 24', as shown in FIG. 5B. The spot 24' is derived only from the central portion of the diffraction pattern, and since the higher order portions of the pattern are of relatively insignificant intensity, they can be ignored. Of course, if desired, the higher order portions can be eliminated by spatial filtering so that only the central portion is focused on the surface S. Such a spatial filter may be placed anywhere in the optical path. In fact, the lens 112 inherently provides some spatial filtering since the lens aperture will not accommodate the entire diffraction pattern and some of the outer portions of the pattern which do impinge upon the lens will create focused higher order spots of such low intensity that they are negligible in comparison to the central spot.

Further explanation of the diffraction pattern produced by a single slit may be found in *Lasers in Industry* especially Section 7.3.5 beginning on page 399 which is incorporated herein by reference. In particular, in that section, FIG. 7-33 shows the diffraction pattern produced by a laser beam passing through a single slit.

The slit size is selected to provide the appropriate astigmatization or elongation of the read spot, and the astigmatizer 104 also reduces the intensity of the beam below the level which would cause the beam to write on surface S. By appropriate selection of laser beam power, beam diameter and slot size, the desired reduction of power in the read mode can be obtained. For example, in one embodiment using a 4mm focal length objective lens, a 3.5mW laser output having a 0.050 inch (approximately 1.3mm) beam diameter, has been reduced to 1mW for the read mode, by the insertion of an astigmatizer having a single slit of 0.008 inch (approximately 0.2mm).

The elongated read spot 24' of reduced power is focused on a selected track over which objective lens assembly 40 has been positioned by movement of arm 21, and the light is reflected back from the grooves 26 and lands 27 through objective lens 112 and into quarter wave plate 110 where the circular polarization is reconverted into linear polarization. The combined effect of passing through wave plate 110 from the laser 101 to the recording surface and again in the return trip is essentially the same as passing through a half wave plate thus producing for the return beam 122 at the output of quarter wave plate 110 a linearly polarized beam which is polarized in a vertical direction. That is, its polarization has been rotated 90° from the polarization of the original beam 102 and 102'. This is indicated by arrows across the return beam 122 in distinction to dots in beam 102, 102' and 102''.

The return beam 122 is co-located with beam 102' between wave plate 110 and beam splitter 106, but since beam 122 is vertically polarized, when it impinges beam splitter 106, it passes through without reflection as was discussed hereinbefore. The return beam 122 then intercepts photocell 127 which detects the data inherent in the reflective beam power in a conventional manner.

In order to more clearly understand the operation of the astigmatizer 104, reference is made to FIG. 6, a top view of the essential optical elements used in producing the elongated read spot. The beam path has been unfolded by removal of splitter 106, thus the astigmatizer 104 and the lens 112 are shown aligned linearly. The incoming beam 102 passes through the vertical slit 208 in astigmatizer unit 104 and produces a diffraction pattern. This pattern, which is shown illustratively as if an image plane had been interposed, has a central portion 215, and higher order portions 216, 217, etc. The diffraction pattern then passes to wave plate 110 and lens 112 where it is focused to form elongated spot 24' at the focal plane which is arranged to be the surface S of the recording disc 10. An optional spatial filter block 213 is indicated in FIG. 6. This has the effect of reducing the aperture of the lens 112 (or the lens assembly 40) so that only the dominant central portion 215 of the diffraction pattern passes to the lens.

A diffraction pattern may, of course, be produced by numerous structures other than the single slit arrangement of FIGS. 1 and 2. For example, a simple edge of an opaque material would produce a similar diffraction pattern, and multiple slit plates as well as a diffraction grating could be substituted for the astigmatizer 104.

Figure 7:
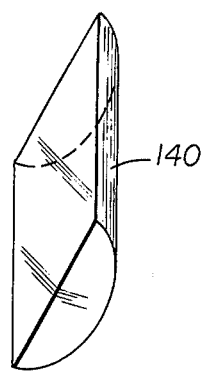
FIG. 7 illustrates an alternative structure for use as the astigmatizer of FIGS. 1 and 2.
Figure 8:
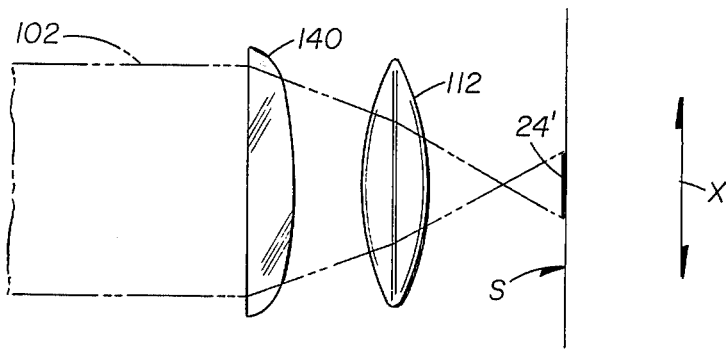
FIGS. 8 and 9 are diagrammatic representations illustrative of the operation of the alternative astigmatizer of FIG. 7.
Figure 9:
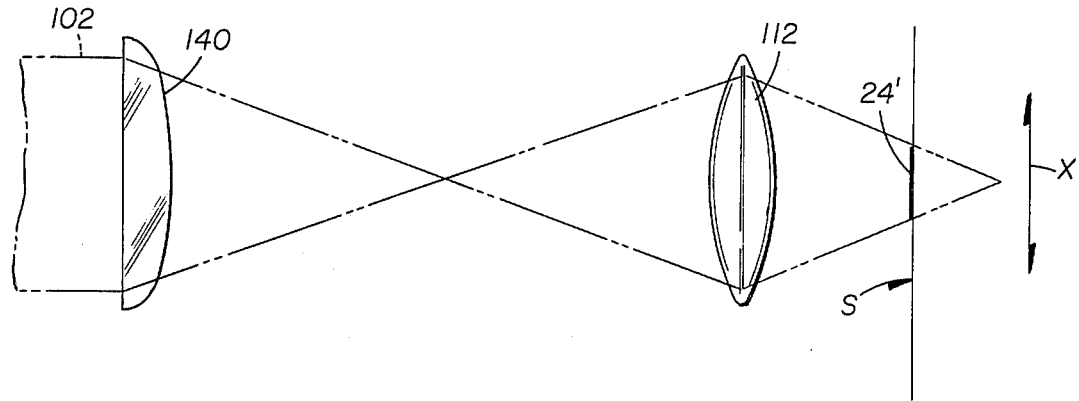

Elongated beams may, of course, also be produced other than by diffraction and FIG. 7 illustrates one of many unidimensional lenses which would astigmatize the beam in one directon without affecting the other. The unidimensional convex lens 140 of FIG. 7 may be inserted into the path of beam 102 as shown in top view in FIG. 8. The effect of lens 140 in the arrangement shown is to reduce the diameter of the beam impinging lens 112 in one direction (labeled X) without affecting any other dimension. The lens 140 may be convex or concave, single or double, and it may actually increase the diameter of the beam impinging upon lens 112, but, for a given focal length of lens 112 the focused spot at the focal plane will be elongated either due to the fact that a narrowed dimension of the beam is focused by lens 112 to the left of surface S as in FIG. 8 or a widened dimension of the beam is focused to the right of surface S as in FIG. 9. In essence, the unidimensional lens acts to change the effective focal length of the objective lens 112 in one direction without changing it in any other. This results in the elongated spot at the original focal plane.

Figure 10:
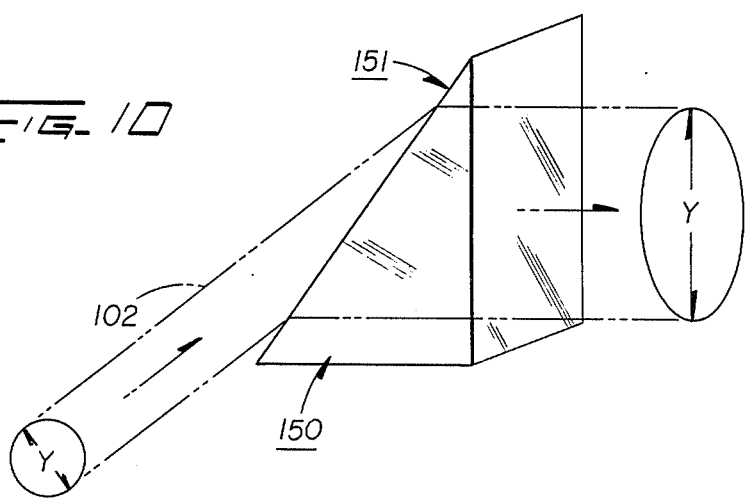
FIG. 10 illustrates another alternative astigmatizer structure.

FIG. 10 illustrates another alternative astigmatizer structure. Prism 150 is oblique and is placed in the path of circular cross-section beam 102. Refraction from the diagonal surface 151 produces a beam of increased dimension in one directon without changing any other dimension. The use of prism 150 would, of course, require additional modifications of the optical system obvious to one skilled in the art to compensate for the angular turn caused by the prism.

In all cases it is to be understood that the above described arrangements are merely illustrative of a small number of the many possible applications of the principles of the present invention. Numerous and varied other arrangements in accordance with these principles may readily be devised by those skilled in the art without departing from the spirit and scope of the invention.

What is claimed is:

1. In combination with a recording and reproducing system of the type having a recording surface being recorded thereon in a pattern of grooves arranged along a track, means for moving the track, a beam source, means for directing a source beam from the beam source continuously along the track on the surface, and means for detecting a reflected beam of energy from the surface to produce an output indicative of the groove pattern on the track, the improvement wherein:

the directing means includes an astigmatizer means, mounted to be removably positioned in the beam path between the beam source and the surface, for elongating the cross-section of the source beam on the surface so that its dimension in a direction transverse to the track is greater than its dimension in the direction of the track, only when said astigmatizer is positioned in the beam path.

2. A combination as claimed in claim 1 wherein the astigmatizer means causes a diffraction pattern of the beam passing through it.

3. A combination as claimed in claim 2 wherein the directing means further includes means for spatially filtering the diffraction pattern to pass only the central portion of the diffraction pattern to the surface.

4. A combination as claimed in claim 2 wherein the astigmatizer means is a plate oriented perpendicular to the beam path when positioned in the beam path and having a single slit therein for causing the diffraction pattern in a direction transverse to the orientation of the slit.

5. A combination as claimed in claim 2 wherein the astigmatizer means is a diffraction grating oriented perpendicular to the beam path when positioned in the beam path.

6. A combination as claimed in claim 1 wherein when positioned in the beam path the astigmatizer means intercepts the beam from the beam source and produces an output beam having a cross-section reduced in one dimension from the corresponding dimension of the input beam.

7. A combination as claimed in claim 1 wherein the directing means includes removable means for attenuating the intensity of the beam from the source.

8. A combination as claimed in claim 1 wherein the astigmatizer means passes only a portion of the cross-section of the beam from the source thereby attenuating the intensity of the beam when the astigmatizer means is positioned in the beam path.

9. A recording and reproducing system comprising, a recording surface, a beam source for generating a high intensity beam of energy, means for directing the beam of energy from the source to a focused spot on the surface, means for moving the focused beam spot relative to the surface, means operable in a write mode for modulating the beam in accordance with input data to cause the focused beam spot to create a depression in the surface representative of selected data bits, the relative movement causing the representation of data to form a pattern of depressions along a track in the direction of relative movement, means operable by being removably positioned in the path of the beam from the source to the surface exclusively in a read mode distinctive from the write mode for astigmatizing the unmodulated beam to form an elongated cross-section of the beam and of the focused beam spot so that the dimension of the focused spot in the direction transverse to the track is greater than its dimension in the direction of the track, said means for directing the beam being operable in the read mode to focus the astigmatized beam to the surface so that the astigmatized beam is reflected from the surface, and means for detecting from the reflected beam an indication of the pattern of depressions.

10. A system as claimed in claim 9 wherein said astigmatizing means causes a diffraction pattern of the beam passing through it.

11. A system as claimed in claim 10 wherein the astigmatizing means is a plate mounted to be removably positioned in the beam path and having a single slit therein for causing the diffraction pattern of the beam in a direction transverse to the orientation of the slit.

12. A system as claimed in claim 9 wherein the astigmatizing means intercepts the beam from the beam source and produces an output beam having a cross-section reduced in one dimension from the corresponding dimension of the input beam.

13. A system as claimed in claim 9 wherein said means for astigmatizing includes means operable exclusively in the read mode for attenuating the unmodulated beam.

* * * * *